United States Patent
Schmalzrieth et al.

(10) Patent No.: US 9,708,006 B2
(45) Date of Patent: Jul. 18, 2017

(54) SUBFRAME FOR A VEHICLE REAR AXLE

(71) Applicant: AUDI AG, Ingolstadt (DE)

(72) Inventors: Sven Schmalzrieth, Manching (DE);
Vladimir Idelevitch, Nürnberg (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 15/296,685

(22) Filed: Oct. 18, 2016

(65) Prior Publication Data
US 2017/0106913 A1 Apr. 20, 2017

(30) Foreign Application Priority Data
Oct. 19, 2015 (DE) .................. 10 2015 013 533

(51) Int. Cl.
| | |
|---|---|
| *B62D 21/15* | (2006.01) |
| *B62D 21/02* | (2006.01) |
| *B60K 1/04* | (2006.01) |
| *B62D 21/09* | (2006.01) |
| *B60K 15/03* | (2006.01) |

(52) U.S. Cl.
CPC .............. *B62D 21/155* (2013.01); *B60K 1/04* (2013.01); *B60K 15/03006* (2013.01); *B62D 21/02* (2013.01); *B62D 21/09* (2013.01); *B60K 2001/0411* (2013.01); *B60K 2015/03328* (2013.01); *B60Y 2200/91* (2013.01); *B60Y 2306/01* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,921,578 A | * | 7/1999 | Sekita | B60G 3/14 280/781 |
| 6,298,936 B1 | | 10/2001 | Yoshida | |
| 7,552,963 B2 | * | 6/2009 | Yamaguchi | B62D 21/152 296/187.08 |
| 7,886,861 B2 | * | 2/2011 | Nozaki | B60K 1/00 180/232 |
| 9,505,437 B2 | * | 11/2016 | Leibl | B60K 17/00 |
| 9,545,952 B2 | * | 1/2017 | Sakaguchi | B62D 21/157 |
| 2006/0278463 A1 | * | 12/2006 | Anzai | B62D 21/11 180/312 |
| 2009/0197154 A1 | * | 8/2009 | Takasaki | B60K 1/04 429/83 |
| 2009/0212548 A1 | * | 8/2009 | Frasch | B62D 21/11 280/785 |

(Continued)

FOREIGN PATENT DOCUMENTS

| | | |
|---|---|---|
| DE | 693 02 854 T2 | 11/1996 |
| DE | 100 07 789 A1 | 8/2000 |

(Continued)

*Primary Examiner* — Nicole Verley
(74) *Attorney, Agent, or Firm* — Henry M. Feiereisen LLC

(57) ABSTRACT

A subframe for a rear axle of a two-track motor vehicle includes a deformation element which, as viewed in a vehicle longitudinal direction, is provided at a forward end of the subframe between the subframe and a functional unit of the motor vehicle such that in the event of a rear-end crash a forward shift of the subframe causes the deformation element to come into contact with the functional unit and to undergo deformation to thereby dissipate crash energy.

19 Claims, 2 Drawing Sheets

(56) References Cited

U.S. PATENT DOCUMENTS

| | | | | |
|---|---|---|---|---|
| 2009/0315311 | A1* | 12/2009 | Tamakoshi | B62D 21/155 280/784 |
| 2010/0084889 | A1* | 4/2010 | Tamakoshi | B62D 21/11 296/187.09 |
| 2010/0101881 | A1* | 4/2010 | Yoda | B60K 1/04 180/68.5 |
| 2010/0201159 | A1* | 8/2010 | Chretien | B62D 21/152 296/193.03 |
| 2012/0212010 | A1* | 8/2012 | Tomozawa | B60K 5/00 296/203.02 |
| 2013/0300152 | A1* | 11/2013 | Nortmann | B62D 21/157 296/187.1 |
| 2015/0008703 | A1* | 1/2015 | Furusaki | B62D 21/152 296/187.08 |
| 2015/0174996 | A1* | 6/2015 | Ikeda | B60K 1/04 180/68.5 |
| 2016/0114667 | A1* | 4/2016 | Ikeda | B60K 1/04 180/68.5 |
| 2016/0236713 | A1* | 8/2016 | Sakaguchi | B60K 1/04 |
| 2016/0311301 | A1* | 10/2016 | Ikeda | B62D 29/001 |
| 2017/0073014 | A1* | 3/2017 | Alwan | B62D 21/155 |
| 2017/0088182 | A1* | 3/2017 | Hara | B60K 1/04 |

FOREIGN PATENT DOCUMENTS

| | | | | |
|---|---|---|---|---|
| DE | 10 2009 053 138 | A1 | 5/2011 | |
| DE | FR 2975657 | B1 * | 11/2015 | B62D 21/155 |
| FR | 2966418 | A1 * | 4/2012 | B62D 21/11 |
| JP | DE 4030740 | A1 * | 4/1991 | B60K 15/03 |

* cited by examiner

SUBFRAME FOR A VEHICLE REAR AXLE

CROSS-REFERENCES TO RELATED APPLICATIONS

This application claims the priority of German Patent Application, Serial No. 10 2015 013 533.3, filed Oct. 19, 2015, pursuant to 35 U.S.C. 119(a)-(d), the disclosure of which is incorporated herein by reference in its entirety as if fully set forth herein.

BACKGROUND OF THE INVENTION

The present invention relates to a subframe for a vehicle rear axle of a two-track motor vehicle.

The following discussion of related art is provided to assist the reader in understanding the advantages of the invention, and is not to be construed as an admission that this related art is prior art to this invention.

An electrically-operated motor vehicle has an electric machine for propelling the rear wheels. The electric machine can be supported by a rear axle bracket or rear subframe to which the wheel guides of the wheel suspension for the rear axle are articulated. A traction battery provided to supply power to the electric machine is installed in the motor vehicle in vehicle longitudinal direction or in travel direction anteriorly of the rear subframe, e.g. in the underbody of the motor vehicle.

It would be desirable and advantageous to provide an improved subframe to obviate prior art shortcomings and to realize superior protection of a crash-sensitive functional unit of a motor vehicle against damage in the event of a crash.

SUMMARY OF THE INVENTION

According to one aspect of the present invention, a subframe for a rear axle of a two-track motor vehicle includes a deformation element provided, as viewed in a vehicle longitudinal direction, at a forward end of the subframe between the subframe and a functional unit of the motor vehicle such that in the event of a rear-end crash a forward shift of the subframe causes the deformation element to come into contact with the functional unit and to undergo deformation to thereby dissipate crash energy.

The present invention resolves prior art problems by providing a subframe at the front, as viewed in the vehicle longitudinal direction, with a deformation element that as a result is situated between the subframe and the crash-sensitive functional unit. As the subframe is shifted forwards when the motor vehicle is involved in a rear-end crash, the deformation element impacts the functional unit and deforms to thereby dissipate crash energy between the subframe and the functional unit. As a result, crash energy is substantially prevented from being transmitted in the direction of the functional unit, so that damage to the functional unit is reduced, when the motor vehicle is rear-ended.

According to another aspect of the present invention, a motor vehicle includes a functional unit, and a subframe which includes a deformation element provided, as viewed in a vehicle longitudinal direction, at a forward end of the subframe between the subframe and the functional unit such that in the event of a rear-end crash a forward shift of the subframe causes the deformation element to come into contact with the functional unit and to undergo deformation to thereby dissipate crash energy.

The motor vehicle may be propelled, at least in part, electrically and thus includes an electric machine to propel the wheels, with the electric machine being supported by the subframe. In this case, the crash-sensitive functional unit may be a traction battery. Other examples of a functional unit include a natural gas tank or a power electronics for a traction battery.

According to another advantageous feature of the present invention, the subframe can include two longitudinal members which are spaced from one another in a vehicle transverse direction, each longitudinal member having a front end face in confronting relationship to the functional unit, with the deformation element being formed at the end face. The longitudinal members in particular, which extend in the vehicle longitudinal direction, can intrude, without deformation, into forwardly adjoining structural parts. This can now be prevented by the presence of the deformation element in the force path defined between the longitudinal members and the functional unit, e.g. traction battery, in the event of a rear-end crash.

The deformation element may be formed of same material as the longitudinal member and/or made in one piece therewith. As an alternative, the deformation element may also represent a separate structure which is mounted to the longitudinal member, e.g. by a bolted connection.

According to another advantageous feature of the present invention, a leading cross member can be provided to connect the longitudinal members with one another at corner junction points, respectively. Each longitudinal member can hereby be configured to extend forwards beyond the corner junction point by a front segment so as to project beyond the leading cross member by an overhang. The longitudinal members may, in addition, also be connected to one another by a trailing cross member. The leading and trailing cross members can thus be connected to the two longitudinal members at leading and trailing corner junction points to thereby realize a closed frame structure that can be used to anchor the electric machine via bearing points.

The front segment of the longitudinal segment may have an end formed with a bearing eye to support a subframe bearing for attachment to the vehicle body. Advantageously, the front segment can be curved outwards from the corner junction point in the vehicle transverse direction. In order to deflect a force introduced as a result of a crash in a beneficial manner, the curved front segment has a curve-outer wall portion which points forwards in the vehicle longitudinal direction to form the front end face, with the deformation element being formed on the longitudinal member. The wall portion of the front segment to form the end face of the longitudinal member can thus extend across a large surface area between the bearing eye and the corner junction point where the cross member meets the longitudinal member.

To realize a good deformation capability in the event of a rear-end crash, it is advantageous, when the deformation element has a largest possible dimension. Advantageously, the deformation element can be configured to extend continuously between the vehicle outer bearing eye and the vehicle inner corner junction point. The deformation element can also be configured to expand inwardly in a wedge-shaped manner, as viewed in vehicle transverse direction.

According to another advantageous feature of the present invention, the deformation element has a front side which can be spaced in the vehicle longitudinal direction from the functional unit by a clearance during normal driving mode.

The front side of the deformation element may extend in flush alignment with the bearing eye in the vehicle longitudinal direction.

According to another advantageous feature of the present invention, the longitudinal member has a middle segment oriented in the vehicle longitudinal direction, with the front segment transitioning at the rear, as viewed in the vehicle longitudinal direction, into the middle segment at the corner junction point. The middle segment may hereby be oriented in alignment with the vehicle longitudinal direction. Advantageously, the deformation element has an inner sidewall which can be oriented in alignment with an inner wall portion of the middle segment in the vehicle longitudinal direction. As a result, the deformation element can be sized as large as possible and yet prevented from interfering with adjoining structures.

According to another advantageous feature of the present invention, the leading cross member can be arranged behind a front side of the deformation element by a longitudinal offset to thereby define a free space between the leading cross member and the front side of the deformation element.

In the event of a rear-end crash, the electric machine can be ripped from its anchoring in the subframe and can shift forwards in relation to the subframe in the vehicle longitudinal direction in a direction towards the functional unit, e.g. traction battery. To prevent impact of the electric machine in such a crash situation with the traction battery, the deformation element can be configured such as to deform in the vehicle transverse direction into the free space. As the deformation element deforms, it forms a stop for the electric machine as it is ripped from the subframe. As a result, a direct collision of the electric machine with the traction battery is prevented. Such a crash-caused deformation inwards of the vehicle is established in particular as a result of the afore-described wedge-shaped expansion of the deformation element inwards in the vehicle transverse direction.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
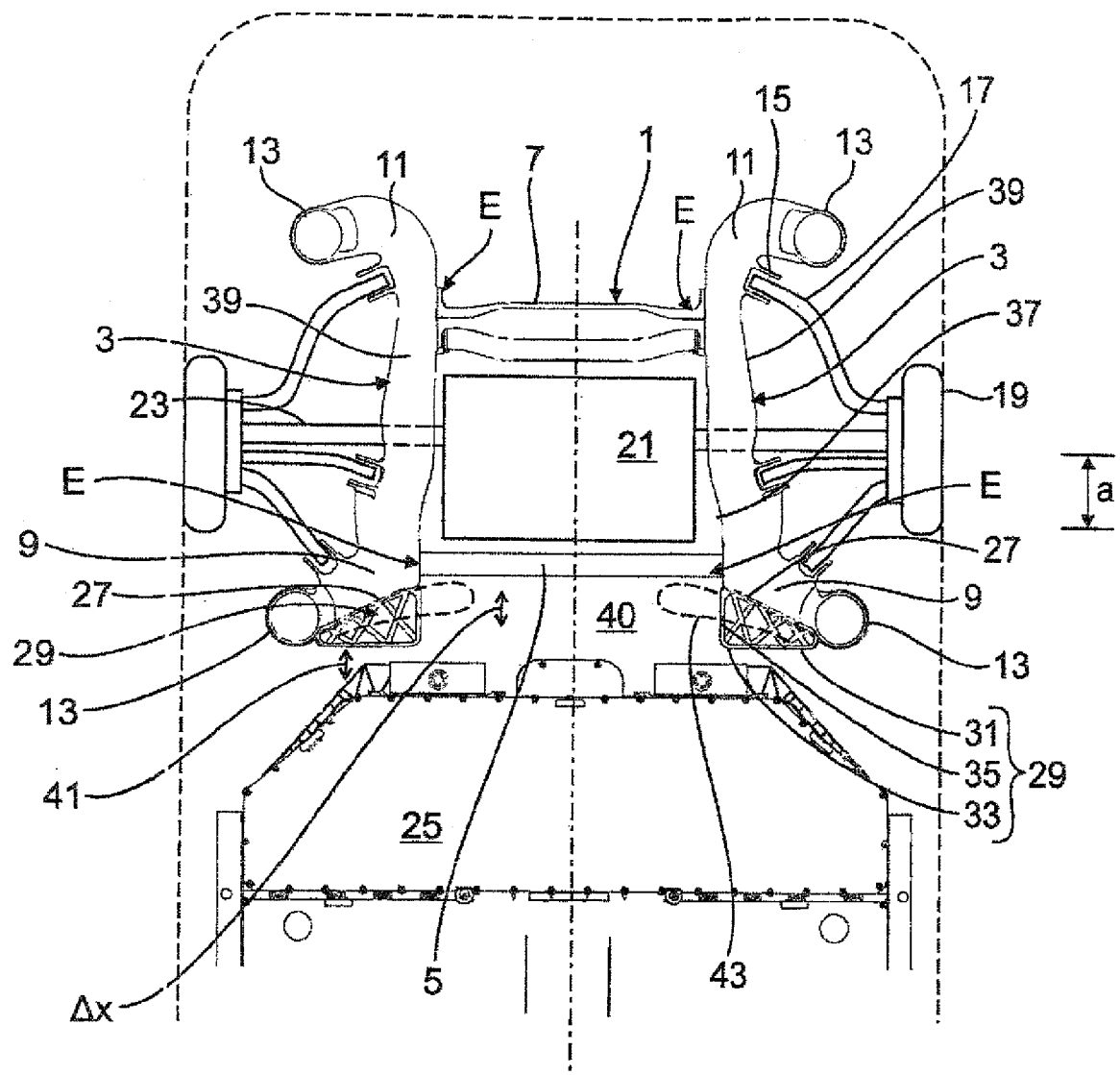
FIG. 1 is a rough, schematic illustration of a rear-side subframe according to the present invention from above for an electrically-operated two-track motor vehicle.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 2:
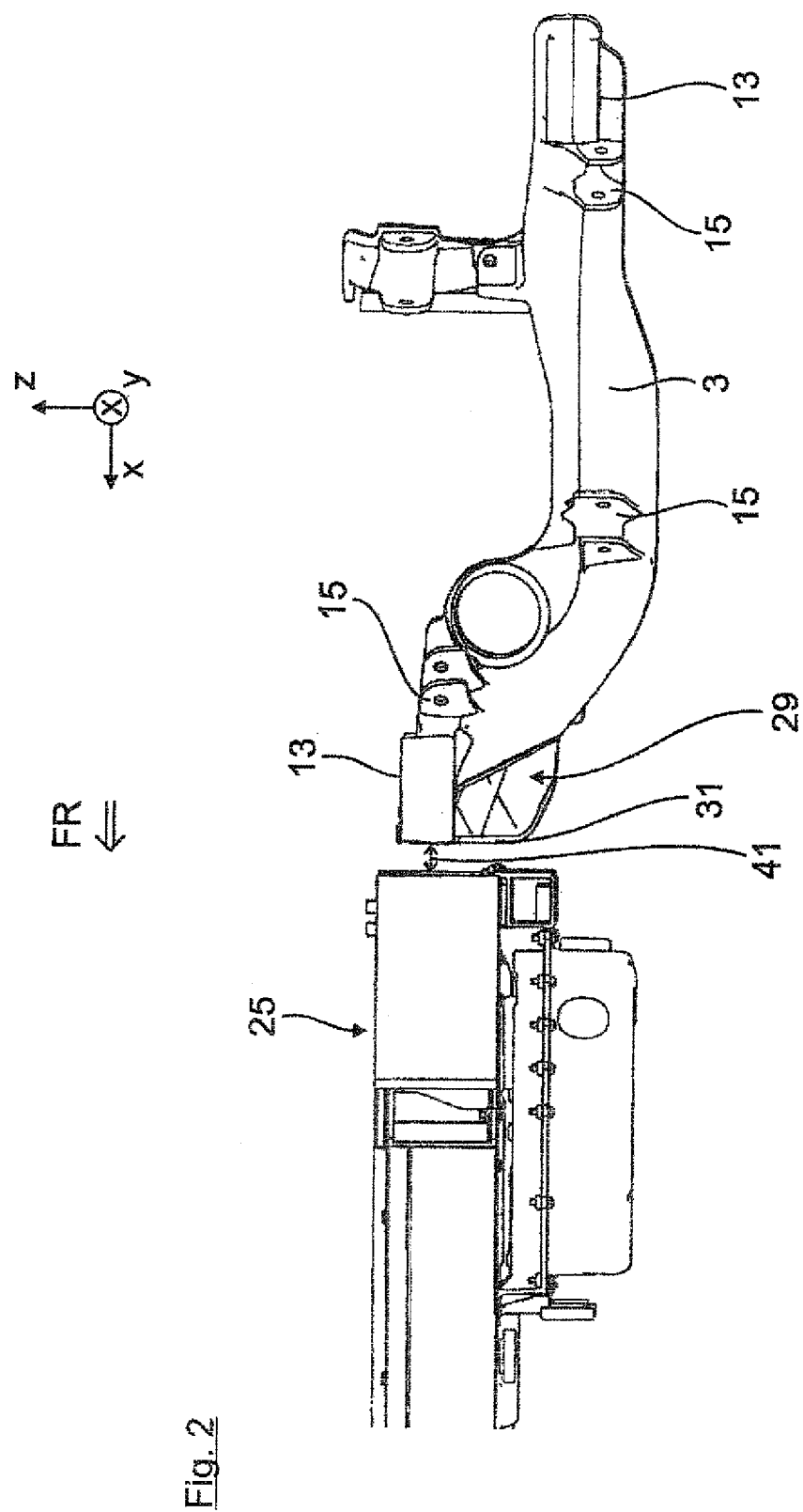
FIG. 2 a side view of the rear-side subframe and a traction battery as situated in a rear region of the motor vehicle.

Turning now to the drawing, and in particular to FIG. 1, there is shown a rough, schematic illustration of a rear-side subframe according to the present invention from above for an electrically-operated two-track motor vehicle. It will be understood by persons killed in the art that FIG. 1 and also FIG. 2 represent simplified illustration for ease of understanding of the invention and do not reflect an accurate construction of the rear portion of the vehicle.

FIG. 1 shows schematically a rear region of the vehicle, including a rear axle which has a trailing subframe, generally designated by reference numeral 1 and constructed in the form of a substantially closed frame. The subframe 1 includes two longitudinal members 3 which are spaced from one another in a vehicle transverse direction y, and leading and trailing cross members 5, 7 which extend in the vehicle transverse direction y to connect the longitudinal members 3 with one another at leading and trailing corner junction points E. The longitudinal members 3 are sized to extend by front segments 9 and rear segments 11, respectively, in vehicle longitudinal direction x forwards and rearwards beyond the respective corner junction points E by an overhang a. Bearing eyes 13 are formed at the end of the front segments 9 and rear segments 11 for receiving bearings, not shown in greater detail, via which the subframe 1 can be attached to the vehicle body of the motor vehicle.

Brackets 15 are respectively formed laterally outside on the longitudinal members 3 for articulation of wheel guides 17 of a wheel suspension for the rear wheels 19 of the motor vehicle.

In the non-limiting example of FIG. 1, the rear wheels 19 are propelled by an electric machine 21 which is supported by the subframe 1. The electric machine 21 is positioned in the vehicle longitudinal direction x between the leading and trailing cross members 5, 7 and connected in driving relationship to both rear wheels 19 via output shafts 23. A traction battery 25 supplies the electric machine 21 with electric energy and represents a sensitive functional unit. As shown in. FIGS. 1 and 2, the traction battery 25 is installed in the underbody of the motor vehicle and anteriorly of the subframe 1 in the vehicle longitudinal direction x, By way of example, the traction battery 25 may be positioned underneath a rear seat row of the motor vehicle.

As further shown in FIG. 1, the front segments 9 of the longitudinal members 3 are curved to the vehicle outside from the leading corner junction points E in the vehicle transverse direction y. Each of the front segments 9 has a curve-outer wall portion 27 upon which a deformation element 29 is formed. The deformation element 29 on each front segment 9 of the longitudinal members 3 is arranged in the vehicle longitudinal direction x (or in travel direction FR) between the subframe 1 and the traction battery 25. When involved in a rear-end crash, as will be described hereinafter, the subframe 1 can shift in the direction of the traction battery 25. In such a crash situation, the deformation elements 29 of the subframe 1 are able to at least partly prevent a transmission of crash energy into the traction battery 25, as the deformation elements 29 undergo a deformation.

In the following, the geometry and positioning of the respective deformation element 29 on the longitudinal member 3 are described. The curve-outer wall portion 27 extends on the end face of the longitudinal member 3 continuously between the bearing eye 13, formed at the end of the longitudinal member 3, and a corner junction point E, where the longitudinal member 3 and the leading cross member 5 converge. The wall portion 27 of the front segment 9 of the longitudinal member 3 is covered throughout by the deformation element 29. Each of the deformation elements 29 widens hereby in the vehicle transverse direction y inwardly in the form of a wedge such that the front side 31 of the deformation element 29 ends in the vehicle longitudinal direction x towards the front at a same level as the bearing eyes 13. This is apparent from FIG. 2.

The front side 31 of the deformation element 29 transitions at a vehicle-inner edge of the deformation element 29 to an inner wall 35 which is angled at a right angle. The inner walls 35 of the two deformation elements 29 confront one another in the vehicle transverse direction y and are oriented in the vehicle longitudinal direction x substantially in alignment with a vehicle-inner wall portion 37 of a middle segment 39 of the longitudinal member 3.

During normal driving mode, the leading cross member 5 is arranged behind the front sides 31 of the deformation elements 29 by a longitudinal offset Δx, with a free space 40 being defined between the leading cross member 5 and the front sides 31 of the deformation elements 29. The font sides 31 of the deformation elements 29 are, in turn, spaced from the traction battery 25 by a clearance 41, as best seen in FIG. 2. In the event of a rear-end crash and when the crash energy is great enough, the subframe 1 can detach from the vehicle body and the entire vehicle body compresses or deforms. In such a crash scenario, the subframe I can shift forwards in the vehicle longitudinal direction x, i.e. in travel direction FR, towards the traction battery 25. In this situation, the deformation elements 29 between the longitudinal members 3 and the traction battery 26 undergo deformation so that the force potentially impacting the traction battery 25 is at least reduced. In the event of a rear-end crash, the wedge-shaped configuration of the deformation elements 29 causes the deformation elements 29 to deform inwards into the free space 40 in the vehicle transverse direction y, thereby forming stops 43, shown by dashed lines in FIG. 1. The stops 43 prevent a direct collision of the electric machine 21 with the traction battery 25, when the electric machine 21 is ripped from its anchoring on the subframe 1 in the event of the rear-end crash.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A subframe for a rear axle of a two-track motor vehicle, comprising a deformation element provided, as viewed in a vehicle longitudinal direction, at a forward end of the subframe between the subframe and a functional unit of the motor vehicle such that in the event of a rear-end crash a forward shift of the subframe causes the deformation element to come into contact with the functional unit and to undergo deformation to thereby dissipate crash energy.

2. The subframe of claim 1, further comprising two longitudinal members spaced from one another in a vehicle transverse direction, each said longitudinal member having a front end face in confronting relationship to the functional unit, said deformation element being formed at the end face.

3. The subframe of claim 2, further comprising a leading cross member configured to connect the longitudinal members with one another at corner junction points, respectively, each said longitudinal member being configured to extend forwards beyond the corner junction point by a front segment so as to project beyond the leading cross member by an overhang.

4. The subframe of claim 3, wherein the front segment is curved outwards in the vehicle transverse direction.

5. The subframe of claim 4, wherein the curved front segment has a curve-outer wall portion which points forward in the vehicle longitudinal direction to form the front end face upon which the deformation element is formed.

6. The subframe of claim 5, wherein the deformation element and the longitudinal member are made of same material.

7. The subframe of claim 5, wherein the deformation element and the longitudinal member are made in one piece.

8. The subframe of claim 5, further comprising a bearing including a bearing eye which is formed at an end of the front segment, said wall portion being sized to extend between the bearing eye and the corner junction point between the longitudinal member and the cross member.

9. The subframe of claim 8, wherein the deformation element is configured to extend continuously between the bearing eye and the corner junction point.

10. The subframe of claim 1, wherein the deformation element is configured to expand inwardly in a wedge-shaped manner, as viewed in a vehicle transverse direction.

11. The subframe of claim 1, wherein the deformation element has a front side which is spaced in the vehicle longitudinal direction from the functional unit by a clearance during normal driving mode.

12. The subframe of claim 8, wherein the deformation element has a front side which ends in the vehicle longitudinal direction towards the front at a same level as the bearing eye.

13. The subframe of claim 3, wherein the longitudinal member has a middle segment oriented in the vehicle longitudinal direction, said front segment transitioning at the rear, as viewed in the vehicle longitudinal direction, into the middle segment at the corner junction point.

14. The subframe of claim 13, wherein the deformation element has an inner sidewall oriented in alignment with an inner wall portion of the middle segment in the vehicle longitudinal direction.

15. The subframe of claim 3, wherein the leading cross member is arranged behind a front side of the deformation element such as to define a free space there between, said deformation element being configured to deform in the vehicle transverse direction into the free space in the event of the rear-end crash to thereby form a stop for a drive component, supported by the subframe, when the drive component is shifted forwards as a result of the rear-end crash.

16. A motor vehicle, comprising:
a functional unit; and
a subframe comprising a deformation element provided, as viewed in a vehicle longitudinal direction, at a forward end of the subframe between the subframe and the functional unit such that in the event of a rear-end crash a forward shift of the subframe causes the deformation element to come into contact with the functional unit and to undergo deformation to thereby dissipate crash energy.

17. The motor vehicle of claim 16, wherein the functional unit is a member selected from the group consisting of natural gas tank, traction battery, and power electronics for the traction battery.

18. The motor vehicle of claim 16, further comprising wheels, and an electric machine to propel the wheels, said electric machine being supported by the subframe.

19. The motor vehicle of claim 16, wherein the subframe includes two longitudinal members spaced from one another in a vehicle transverse direction, with the electric machine being arranged between the longitudinal members, each said longitudinal member having a front end face in confronting relationship to the functional unit, said deformation element being formed at the end face.

* * * * *